United States Patent
Koga et al.

(10) Patent No.: US 12,120,436 B2
(45) Date of Patent: Oct. 15, 2024

(54) MONITORING CAMERA AND IMAGE PROCESSING METHOD

(71) Applicant: PANASONIC I-PRO SENSING SOLUTIONS CO., LTD., Fukuoka (JP)

(72) Inventors: Masashi Koga, Fukuoka (JP); Jun Ikeda, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 230 days.

(21) Appl. No.: 17/698,522

(22) Filed: Mar. 18, 2022

(65) Prior Publication Data
US 2022/0311935 A1   Sep. 29, 2022

(30) Foreign Application Priority Data

Mar. 24, 2021 (JP) ................... 2021-049933

(51) Int. Cl.
*H04N 23/80* (2023.01)
*G06T 7/11* (2017.01)
*H04N 23/55* (2023.01)

(52) U.S. Cl.
CPC ............... *H04N 23/80* (2023.01); *G06T 7/11* (2017.01); *H04N 23/55* (2023.01); *G06T 2207/20081* (2013.01)

(58) Field of Classification Search
CPC ........ H04N 23/80; H04N 23/55; H04N 23/11; H04N 23/12; H04N 23/617; H04N 23/667; H04N 23/75; H04N 23/56; G06T 7/11; G06T 2207/20081; G06V 10/143; G06V 20/50
See application file for complete search history.

(56) References Cited

U.S. PATENT DOCUMENTS

| | | | | |
|---|---|---|---|---|
| 9,341,517 | B1* | 5/2016 | Stone | G01J 1/4228 |
| 2002/0030755 | A1* | 3/2002 | Uchino | H04N 23/56 |
| | | | | 348/E5.029 |
| 2003/0174332 | A1* | 9/2003 | Kwon | G01N 21/538 |
| | | | | 356/437 |
| 2007/0183657 | A1* | 8/2007 | Kidono | H04N 25/131 |
| | | | | 382/162 |

(Continued)

FOREIGN PATENT DOCUMENTS

JP     2012-090152     5/2012

*Primary Examiner* — Abdelaaziz Tissire
(74) *Attorney, Agent, or Firm* — Greenblum and Bernstein, P.L.C.

(57) ABSTRACT

A monitoring camera includes an image-capturing element that has a plurality of pixels, and that is configured to acquire, for each of the pixels, a blue component signal, a red component signal, and a green component signal corresponding to light which is from a subject and which is incident through fog or haze, an optical filter that is disposed between the subject and the image-capturing element, and that is configured to transmit specific-wavelength light having a wavelength equal to or larger than a specific wavelength among light from the subject, and a processor that is configured to generate and output a captured image of the subject based on either a blue component signal, a red component signal and a green component signal for each of the pixels corresponding to the specific-wavelength light or a blue component signal for each of the pixels corresponding to the specific-wavelength light.

6 Claims, 12 Drawing Sheets

(56) References Cited

U.S. PATENT DOCUMENTS

| | | | | |
|---|---|---|---|---|
| 2008/0007429 A1* | 1/2008 | Kawasaki | ............ | G01J 1/4228 |
| | | | | 340/905 |
| 2008/0151401 A1* | 6/2008 | Chang | ................. | G02B 26/007 |
| | | | | 359/819 |
| 2009/0147112 A1* | 6/2009 | Baldwin | ................ | G03B 17/00 |
| | | | | 348/E5.091 |
| 2011/0122252 A1* | 5/2011 | Choi | ..................... | H04N 23/71 |
| | | | | 348/E5.09 |
| 2011/0310014 A1* | 12/2011 | Mizuno | ............... | H04N 25/134 |
| | | | | 348/E9.002 |
| 2015/0244995 A1* | 8/2015 | Sekiguchi | ........... | H04N 25/134 |
| | | | | 348/164 |
| 2018/0348596 A1* | 12/2018 | Reed | ...................... | G03B 11/00 |
| 2022/0075211 A1* | 3/2022 | Schmeder | .............. | G02C 7/104 |
| 2022/0375131 A1* | 11/2022 | Koga | .................... | G06V 10/56 |

\* cited by examiner

MONITORING CAMERA AND IMAGE PROCESSING METHOD

CROSS-REFERENCE TO RELATED APPLICATIONS

This application is based on and claims priority under 35 USC 119 from Japanese Patent Application No. 2021-049933 filed on Mar. 24, 2021, the contents of which are incorporated herein by reference.

TECHNICAL FIELD

The present disclosure relates to a monitoring camera, an image processing method, and a program.

BACKGROUND ART

Patent Literature 1 discloses an image-capturing apparatus including: an image-capturing element that captures an image of a subject; a switching device that can switch an optical filter inserted between the subject and the image-capturing element between a first filter that blocks infrared light and a second filter that blocks visible light; a determination unit that determines, based on a captured image of the subject, whether there is a fluctuation phenomenon (for example, a haze phenomenon) that occurs due to presence of an air layer in which atmospheres having different densities are mixed between the subject and the image-capturing element; and a control unit that controls the switching device in accordance with a determination result to control switching of the optical filter. Accordingly, an influence of the fluctuation phenomenon such as the haze phenomenon included in a captured image is reduced.

CITATION LIST

Patent Literature

Patent Literature 1: JP-2012-90152-A

In the configuration of Patent Literature 1, when it is determined that the fluctuation phenomenon such as the haze phenomenon occurs, since the optical filter that blocks the visible light is uniformly used for an overall image-capturing surface, a captured image of the subject may become dark. Particularly, when monitoring a distant subject (for example, an airport, a distant part of a long-distance bridge, or a point of a harbor) as viewed from a monitoring camera, in a case where the optical filter that uniformly blocks the visible light is used, a portion of the subject may become dark as a whole. As a result, efficiency of observation work may be reduced, such as difficulty in determining a situation of the subject. Therefore, when a phenomenon (for example, not limited to the above-described haze phenomenon but also a meteorological phenomenon such as fog or haze) that causes image quality of a captured image of the subject to deteriorate occurs, it can be said that there is room for improvement as compared with the related art from a viewpoint of preventing the deterioration of the image quality of the captured image of the subject.

SUMMARY OF INVENTION

The present disclosure has been made in view of the above-described related-art circumstances, and an object thereof is to provide a monitoring camera, an image processing method, and a program that improve image quality of an image of a subject to improve efficiency of observation work even when a phenomenon that causes the image quality of the captured image of the subject to deteriorate occurs.

The present disclosure provides a monitoring camera including an image-capturing element that has a plurality of pixels, and that is configured to acquire, for each of the pixels, a blue component signal, a red component signal, and a green component signal corresponding to light which is from a subject and which is incident through fog or haze; an optical filter that is disposed between the subject and the image-capturing element, and that is configured to transmit specific-wavelength light having a wavelength equal to or larger than a specific wavelength among light from the subject; and a processor that is configured to generate and output a captured image of the subject based on either a blue component signal, a red component signal and a green component signal for each of the pixels corresponding to the specific-wavelength light or a blue component signal for each of the pixels corresponding to the specific-wavelength light.

Further, the present disclosure provides a monitoring camera including an image-capturing element that comprises a plurality of pixels, and that is configured to acquire, for each of the pixels, a blue component signal, a red component signal, and a green component signal corresponding to light which is from a subject and which is incident through fog or haze; and a processor that is configured to generate a luminance signal based on a red component signal for each of the pixels corresponding to light from the subject, and to generate a first pixel signal in which a color corresponding to a specific hue is colored and a second pixel signal in which a color corresponding to the specific hue is not colored based on a blue component signal, a red component signal, and a green component signal for each of the pixels corresponding to light from the subject. The processor generates and outputs a captured image of the subject based on the luminance signal, the first pixel signal, and the second pixel signal.

Further, the present disclosure provides an image processing method executed by a monitoring camera. The image processing method includes a step of transmitting specific-wavelength light having a wavelength equal to or larger than a specific wavelength among light that is from a subject and that is incident through fog or haze by an optical filter provided in the monitoring camera; a step of acquiring, for each of pixels, a blue component signal, a red component signal, and a green component signal corresponding to the specific-wavelength light by an image-capturing element that comprises a plurality of the pixels and that is provided in the monitoring camera; and a step of generating and outputting a captured image of the subject based on either a blue component signal, a red component signal, and a green component signal for each of the pixels corresponding to the specific-wavelength light or a blue component signal for each of the pixels corresponding to the specific-wavelength light.

Further, the present disclosure provides an image processing method executed by a monitoring camera. The image processing method includes a step acquiring, for each of pixels, a blue component signal, a red component signal, and a green component signal corresponding to light that is from a subject and that is incident through fog or haze by an image-capturing element that comprises a plurality of the pixels and that is provided in the monitoring camera; a step of generating a luminance signal based on a red component signal for each of the pixels corresponding to light from the subject, and of generating a first pixel signal in which a color corresponding to a specific hue is colored and a second pixel signal in which a color corresponding to the specific hue is not colored, based on a blue component signal, a red component signal, and a green component signal for each of the pixels corresponding to light from the subject; and a step of generating and outputting a captured image of the subject based on the luminance signal, the first pixel signal, and the second pixel signal.

It should be noted that these comprehensive or specific aspects may be realized by a system, a device, a method, an integrated circuit, a computer program, or a recording medium, or may be realized by any combination of the system, the device, the method, the integrated circuit, the computer program, and the recording medium.

According to the present disclosure, even when a phenomenon that causes image quality of a captured image of a subject to deteriorate occurs, the image quality of the image of the subject can be improved to improve efficiency of observation work.

Further advantages and effects of an aspect of the present disclosure will become apparent from the specification and the drawings. These advantages and/or effects are respectively provided by features described in several embodiments, the specification, and the drawings, and it is not necessary to provide all of the advantages and/or effects in order to obtain one or more identical features.

DESCRIPTION OF EMBODIMENTS

Hereinafter, embodiments specifically disclosing a monitoring camera, an image processing method, and a program according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for those skilled in the art to fully understand the present disclosure, and are not intended to limit the subject matter described in the claims.

First Embodiment

Figure 1:
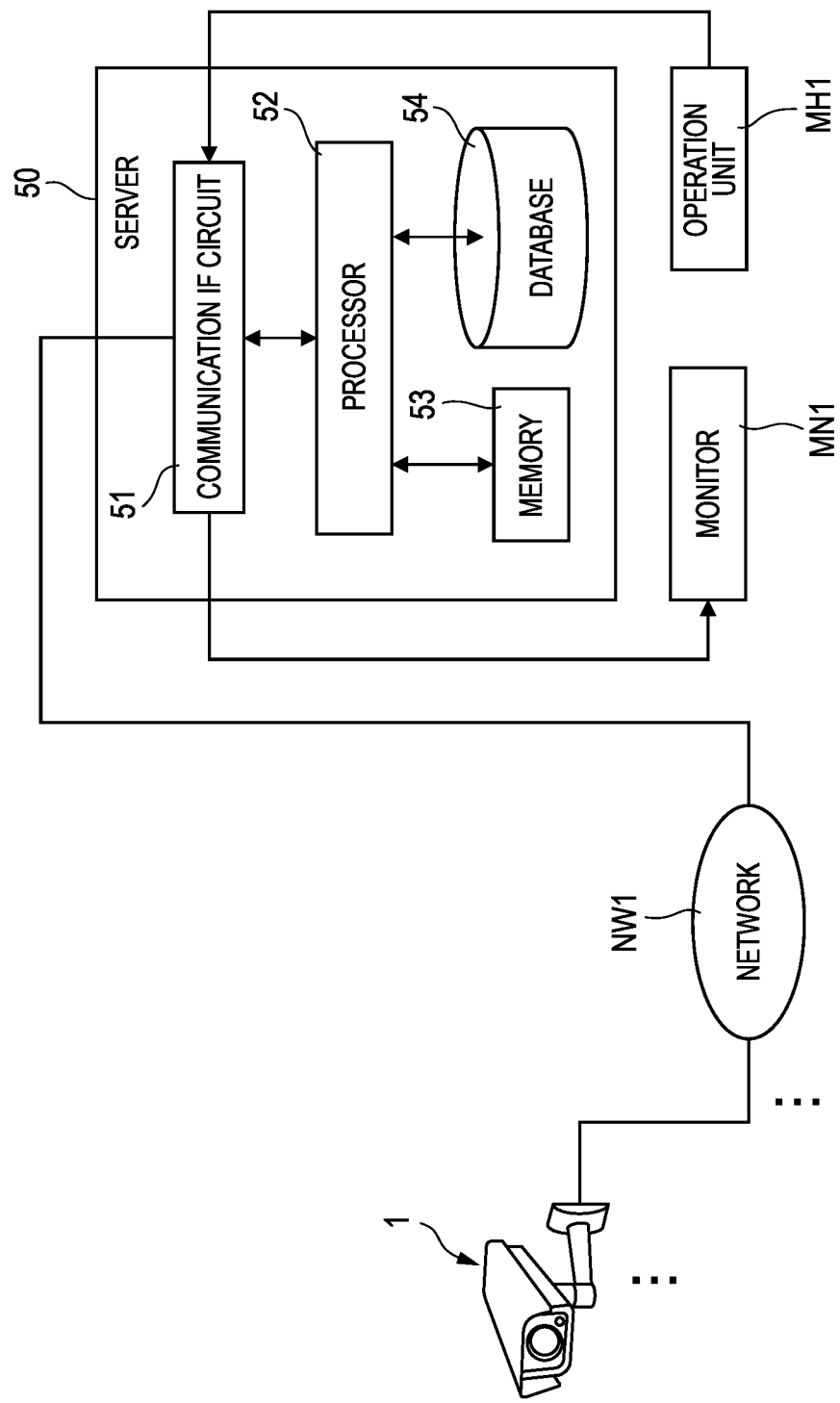
FIG. 1 is a diagram showing a system configuration example of a monitoring camera system according to first and second embodiments.

FIG. 1 is a diagram showing a system configuration example of a monitoring camera system 100 according to first and second embodiments. As shown in FIG. 1, the monitoring camera system 100 includes a monitoring camera 1, and a server 50 to which a monitor MN1 and an operation unit MH1 are connected. The monitoring camera 1 and the server 50 are connected to each other via a network NW1 so as to be able to transmit and receive data to and from each other.

The network NW1 is, for example, a wireless network conforming to any one of a wireless local area network (LAN) such as Wi-Fi (registered trademark), Bluetooth (registered trademark), and Wireless Gigabit (WiGig), but may not be limited thereto. The network NW1 may be a wired network such as a universal serial bus (USB) cable or a wired LAN. In the following description, an image captured by the monitoring camera 1 (hereinafter, referred to as "captured image") includes not only data of the captured image but also information of a camera identification (ID) and an image-capturing date and time of the monitoring camera 1 that captures the captured image.

In order to monitor a subject (for example, a point in a distant monitoring region as viewed from an installation position of the monitoring camera 1), the monitoring camera 1 is disposed in an outdoor place with a good view, such as a meteorological observatory, an airport, a bridge, or a harbor. However, the installation position of the monitoring camera 1 is not limited to the place described above, and may be a pole (not shown) or a parking lot installed on a roadside of a road as long as it is outdoors. The monitoring camera 1 captures an image of a subject within a predetermined angle of view (for example, the distant monitoring region as viewed from the installation position of the monitoring camera 1). Here, the subject is, for example, an airport, a distant part of a long-distance bridge, a harbor, a mountain, or a town, but the subject may not be limited thereto. Further, the monitoring camera 1 is mounted with artificial intelligence (AI), and determines whether a meteorological phenomenon that causes deterioration of image quality such as fog or haze occurs in a captured image of the subject by using the mounted artificial intelligence (see the following description for details).

Figure 2:
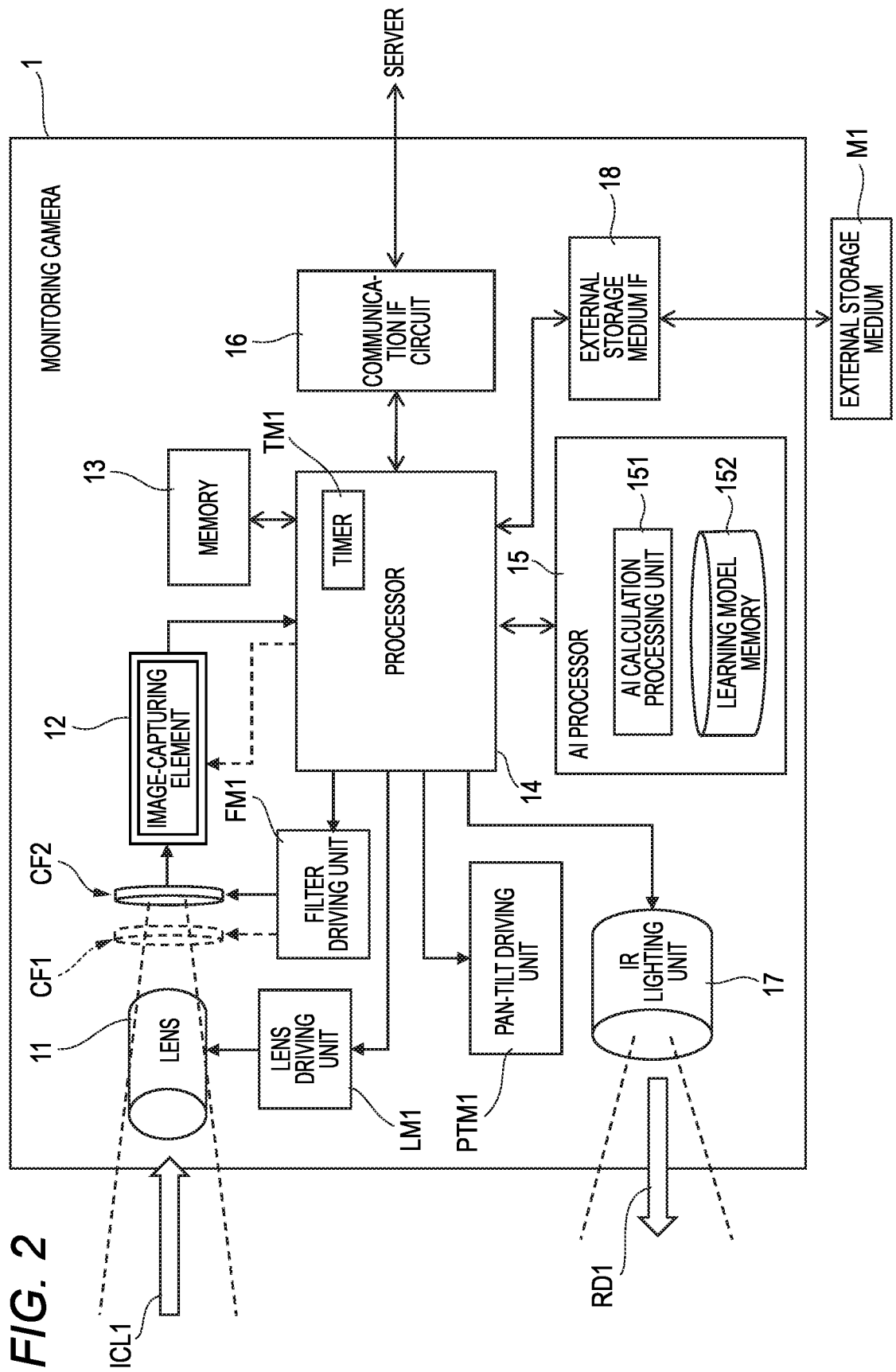
FIG. 2 is a block diagram showing a hardware configuration example of a monitoring camera according to the first and second embodiments.

In the monitoring camera 1, a learned model is stored in a learning model memory 152 (see FIG. 2). The learned model is a parameter group featuring a function of the AI mounted on the monitoring camera 1. That is, the learned model is a parameter group for determining presence or absence of the fog or the haze that is a determination target of the AI mounted on the monitoring camera 1. The learned model may be, for example, a parameter group for using a segmentation technique for determining the presence or absence of the fog or the haze. The learned model is generated by an external terminal (not shown) and stored in the monitoring camera 1 in advance.

Figure 5:
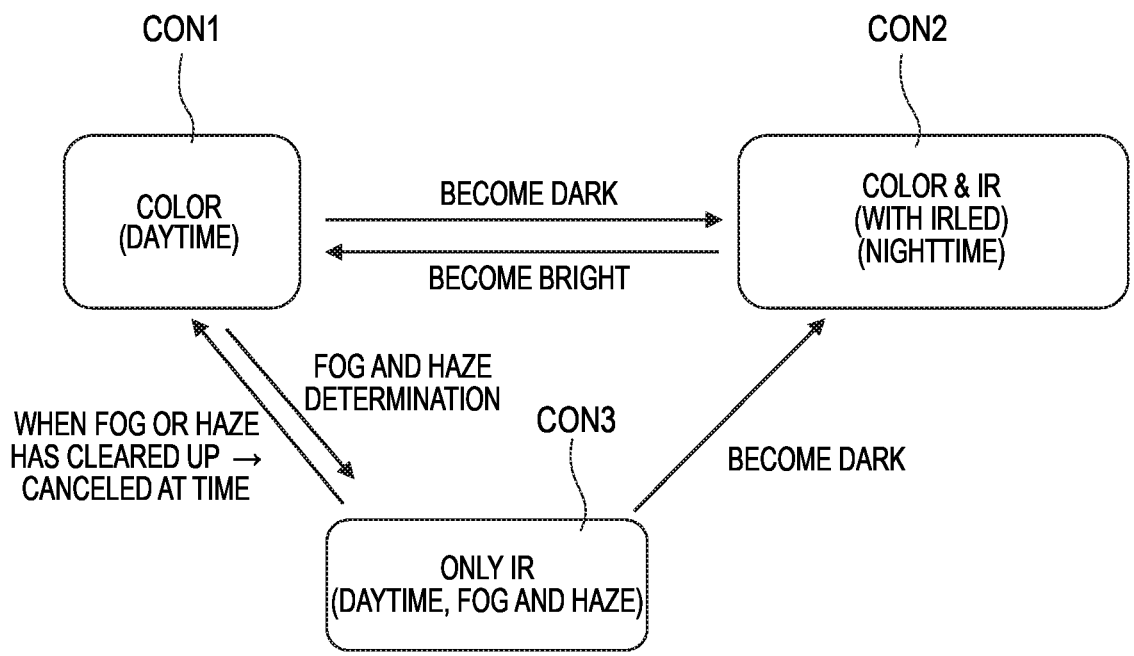
FIG. 5 is a diagram showing a transition example of an operation state of the monitoring camera according to the first embodiment.

The monitoring camera 1 operates in an operation mode corresponding to any one of a daytime state where neither the fog nor the haze occurs (see a state CON1 in FIG. 5 to be described later), a nighttime state (see a state CON2 in FIG. 5 to be described later), and a daytime state where the fog or the haze occurs (see a state CON3 in FIG. 5 to be described later). Details will be described later with reference to FIG. 5.

The server 50 is, for example, an information processing apparatus such as a personal computer, a smartphone, a tablet terminal, or a server computer machine having high-performance specifications. The server 50 performs data communication with the monitoring camera 1 via the network NW1.

The server 50 includes a communication IF circuit 51, a processor 52, a memory 53, and a database 54. In the accompanying drawings, the interface is simply referred to as "IF" for convenience.

The communication IF circuit 51 performs data communication with the monitoring camera 1 via the network NW1 described above. The communication IF circuit 51 receives, for example, the data of the captured image generated and transmitted by the monitoring camera 1, and outputs the received data to the processor 52.

The processor 52 is configured using, for example, a central processing unit (CPU), a digital signal processor (DSP), a graphical processing unit (GPU), or a field programmable gate array (FPGA). The processor 52 functions as a controller that controls an overall operation of the server 50, and performs a control processing for controlling an operation of each unit of the server 50, a data input and output processing between the units of the server 50, a data calculation processing, and a data storage processing. The processor 52 operates in accordance with programs and data stored in the memory 53. The processor 52 uses the memory 53 during an operation, and temporarily stores data or information generated or acquired by the processor 52 in the memory 53.

When receiving the data of the captured image received by the communication IF circuit 51, the processor 52 executes various image processings or analysis processings for observing a state of the subject that appears in the captured image. The processor 52 may execute the image processing or the analysis processing by using a learned model (not shown) learned and generated for each processing or a database 54 described later. Accordingly, the processor 52 can observe the state of the subject with high accuracy. The processor 52 may respond a result of the image processing or the analysis processing to the monitoring camera 1 or another external apparatus (for example, a terminal possessed by an observation requester) connected via the network NW1, or may output (display) the result of the image processing or the analysis processing to the monitor MN1.

The memory 53 is configured using, for example, a random access memory (RAM) and a read only memory (ROM), and temporarily holds a program necessary for executing the operation of the server 50, and data or information generated during an operation. The RAM is, for example, a work memory used when the server 50 operates. The ROM stores and holds, for example, a program for controlling the server 50 in advance.

The database 54 is configured using, for example, a hard disk drive (HDD) or a solid state drive (SSD). The database 54 stores various pieces of collation data (not shown) used for comparison of the subject or an object to be subjected to the image processing or the analysis processing for the observation described above.

The monitor MN1 is a display device configured using, for example, a liquid crystal display (LCD) or organic electroluminescence (EL). The monitor MN1 displays, for example, a result of the image processing or the analysis processing executed by the server 50. The monitor MN1 may be included in the server 50.

The operation unit MH1 is, for example, an input device that receives an input operation of a user such as a mouse, a keyboard, a touchpad, or a touch panel. The operation unit MH1 sends a signal corresponding to the input operation of the user to the server 50. The operation unit MH1 may be included in the server 50.

FIG. 2 is a block diagram showing a hardware configuration example of the monitoring camera 1 according to the first and second embodiments. FIG. 2 also shows an external storage medium M1 inserted into and removed from the monitoring camera 1 in addition to the monitoring camera 1. The external storage medium M1 is, for example, a storage medium such as an SD card.

As shown in FIG. 2, the monitoring camera 1 includes a lens 11, a lens driving unit LM1, a visible light cut filter CF1, an IR cut filter CF2, a filter driving unit FM1, an image-capturing element 12, a memory 13, a processor 14, an AI processor 15, a communication IF circuit 16, an IR lighting unit 17, an external storage medium IF 18, and a pan-tilt driving unit PTM1.

The lens 11 as an example of an image-capturing unit includes, for example, a focus lens and a zoom lens, receives incident light ICL1 that is light reflected by the subject, and forms an optical image of the subject on a light-receiving surface (image-capturing surface) of the image-capturing element 12 via at least one of the visible light cut filter CF1 and the IR cut filter CF2 as necessary. The incident light ICL1 is, for example, light incident through (transmitted through) the fog or the haze that occurs in daytime atmosphere, light incident through (transmitted through) the atmosphere in which neither the fog nor the haze occurs in the daytime, or light incident through (transmitted through) nighttime atmosphere. As the lens 11, a lens having various focal distances or image-capturing ranges can be used in accordance with an installation place, an image-capturing use, or the like of the monitoring camera 1.

The lens driving unit LM1 as an example of the image-capturing unit drives the lens 11 so as to adjust a camera parameter (for example, a position of the focus lens, and a position of the zoom lens corresponding to a zoom magnification) related to the lens 11 based on a control signal from the processor 14.

When it is determined that the fog or the haze occurs in the daytime atmosphere (see the following description), the visible light cut filter CF1 as an example of the image-capturing unit is driven by the filter driving unit FM1 so as to be effective (that is, used). The visible light cut filter CF1 has a spectral characteristic of transmitting light having a wavelength equal to or larger than a specific wavelength (for example, 560±20 [nm: nanometers]) among the incident light ICL1 (an example of light from the subject) transmitted through the lens 11 (see FIG. 3). When it is determined that neither the fog nor the haze occurs in the daytime atmosphere (see the following description), or in the nighttime, the visible light cut filter CF1 is driven by the filter driving unit FM1 so as not to be effective and to be opened (that is, not to be used).

When it is determined that neither the fog nor the haze occurs in the daytime atmosphere (see the following description), the IR cut filter CF2 as an example of the image-capturing unit is driven by the filter driving unit FM1 so as to be effective (that is, used). The IR cut filter CF2 has a spectral characteristic of transmitting visible light (for example, light having a wavelength of 400 to 760 [nm]) and blocking near-infrared light (for example, light having a wavelength of 780 [nm] or more). When it is determined that the fog or the haze occurs in the daytime atmosphere (see the following description) or in the nighttime, the IR cut filter CF2 is driven by the filter driving unit FM1 so as not to be effective and to be opened (that is, not to be used).

The filter driving unit FM1 as an example of the image-capturing unit drives each of the visible light cut filter CF1 and the IR cut filter CF2 so as to adjust control of whether each of the visible light cut filter CF1 and the IR cut filter CF2 is effective (for example, the corresponding filter is disposed on an optical path of the incident light ICL1) based on a control signal from the processor 14.

The image-capturing element 12 as an example of the image-capturing unit includes a plurality of pixels (for example, pixels in which RGB color filters of a Bayer array are provided on respective light-receiving elements), and is, for example, an image sensor such as a charge coupled device (CCD) or a complementary metal oxide semiconductor (CMOS). The image-capturing element 12 performs photoelectric conversion for converting light received by the light-receiving surface (image-capturing surface) constituted by the plurality of pixels described above into an electric signal. Accordingly, the image-capturing element 12 can acquire, for each pixel, a blue component signal (B signal), a red component signal (R signal), and a green component signal (G signal) corresponding to light from the subject as electric signals. The image-capturing element 12 outputs the electric signal (analog signal) corresponding to the light received by the light-receiving surface to the processor 14. The analog signal is converted into data of the captured image in a digital format by the processor 14 as an example of the image-capturing unit. Accordingly, the data of the captured image is generated by the processor 14.

The memory 13 is configured using, for example, a RAM and a ROM, and temporarily holds a program necessary for executing an operation of the monitoring camera 1, and data or information generated during the operation. The RAM is, for example, a work memory used during the operation of the monitoring camera 1. The ROM stores and holds, for example, a program according to the present disclosure for controlling the monitoring camera 1 in advance. In other words, the processor 14 can execute various processings related to the image processing according to the present disclosure on the monitoring camera 1 that is a computer by executing the program stored in the ROM.

The memory 13 stores, for example, thresholds (specifically, a first threshold A and a second threshold B (>the first threshold A)) of a change amount of a high-frequency spatial frequency (see FIG. 6) used when the AI processor 15 performs comparison. Further, the memory 13 stores, as a reference value f1, a predetermined high-frequency spatial frequency among calculation results of spatial frequencies based on pixels corresponding to the subject (target area) that is an observation target in a normal state (that is, a state where neither the fog nor the haze occurs) and an entire area of the captured image. The predetermined high-frequency spatial frequency being the reference value f1 indicates that an edge portion of the captured image (in other words, sharpness of the captured image) is present. Therefore, when the high-frequency spatial frequency among the calculated spatial frequencies is less than the reference value f1, it is indicated that the edge of the captured image is not sharp due to the meteorological phenomenon such as the fog or the haze.

The processor 14 is configured using, for example, a CPU, a DSP, a GPU, or an FPGA. The processor 14 functions as a controller that controls the overall operation of the monitoring camera 1, and performs a control processing for controlling an operation of each unit of the monitoring camera 1, a data input and output processing between the units of the monitoring camera 1, a data calculation processing, and a data storage processing. The processor 14 operates in accordance with the program and the data stored in the memory 13. The processor 14 uses the memory 13 during the operation, and temporarily stores data or information generated or acquired by the processor 14 in the memory 13.

The processor 14 as an example of the image-capturing unit may generate data of the captured image in a digital format by performing a predetermined signal processing on the electric signal output from the image-capturing element 12. The processor 14 sends the generated data of the captured image to the AI processor 15.

The processor 14 includes a timer TM1, can grasp current time based on an output of the timer TM1, and outputs a control signal for instructing irradiation of IR light to the IR lighting unit 17 in the nighttime (in other words, near sunset to near dawn). The timer TM1 includes a circuit that measures an elapsed time (that is, a current time) since a predetermined reference time, and sends a time measurement output (count value) to the processor 14. Accordingly, the processor 14 can specify the current time.

The processor 14 as an example of a control unit switches an operation mode (see FIG. 5) based on the output of the timer TM1 and a processing result of the AI processor 15 (for example, a determination result of whether the fog or the haze occurs in the atmosphere in which the subject (for example, the point in the distant monitoring region as viewed from the installation position of the monitoring camera 1) is visible). FIG. 5 is a diagram showing a transition example of an operation state of the monitoring camera 1 according to the first embodiment. As shown in FIG. 5, the monitoring camera 1 operates in an operation mode corresponding to any one of the daytime state CON1 where neither the fog nor the haze occurs, the nighttime state CON2, and the daytime state CON3 where the fog or the haze occurs.

For example, the processor 14 determines to operate in the operation mode corresponding to the state CON2 in the nighttime (for example, in a time zone from 18:00 to 6:00) by the output of the timer TM1. That is, in order to capture an image of the subject in the nighttime, the processor 14 opens (that is, does not use) the visible light cut filter CF1 and the IR cut filter CF2, and captures an image of the subject by using a color R (Red) G (Green) B (Blue) signal under irradiation of the IR light by the IR lighting unit 17 (for example, an IRLED). The time zone in the nighttime may be different depending on a season, and data indicating the time zone in the nighttime may be stored in the memory 13 for each season or month. Each pixel of the image-capturing element 12 has sensitivity even in a wavelength region of the near-infrared light, and the processor 14 can capture an image of the subject even in a dark environment by radiating the IR light. However, since a color cannot be correctly reproduced, the processor 14 generates a monochrome image of the subject. Determination of the daytime and the nighttime may be performed using an output value of an illuminance sensor (not shown) provided in the monitoring camera 1 without using the timer TM1.

For example, the processor 14 operates in an operation mode in which the state CON1 or the state CON3 is selected based on the processing result (see the above description) of the AI processor 15 in a time zone other than the nighttime (that is, the daytime, for example, a time zone from 6:00 to 18:00) by the output of the timer TM1. Specifically, when the AI processor 15 determines that neither the fog nor the haze occurs in the atmosphere in which the subject (for example, the point in the distant monitoring region as viewed from the installation position of the monitoring camera 1) is visible, the processor 14 determines to operate in an operation mode corresponding to the state CON1. That is, in order to capture an image of the subject in the daytime in which neither the fog nor the haze occurs in the atmosphere, the processor 14 only makes the IR cut filter CF2 effective (that is, usable), and captures an image of the subject by using the color RGB signals described above. Accordingly, the processor 14 can obtain data of a color image based on light from which a wavelength of the near-infrared light that influences color reproduction is removed.

When the AI processor 15 determines that the fog or the haze occurs in the atmosphere in which the subject (for example, the point in the distant monitoring region as viewed from the installation position of the monitoring camera 1) is visible, the processor 14 determines to operate in an operation mode corresponding to the state CON3. That is, in order to capture an image of the subject in the daytime in which the fog or the haze occurs in the atmosphere, the processor 14 only makes the visible light cut filter CF1 that blocks visible light having a wavelength less than a specific wavelength (see the above description) effective (that is, usable), and captures an image of the subject by using the color RGB signals or the B signal described above (see FIG. 3). Accordingly, the processor 14 can obtain data of a high-quality captured image in which an influence of the fog or the haze is reduced although an amount of the visible light is reduced as compared with the state CON1. Further, if a degree of the fog or the haze is not high (for example, the change amount of the high-frequency spatial frequency is less than the second threshold B shown in FIG. 6), the processor 14 can obtain data of the captured image in a state where a decrease amount of light is suppressed, as compared with a state where all visible light is cut as disclosed in Patent Literature 1.

When the AI processor 15 determines that the fog or the haze in the atmosphere has cleared up in the daytime, the processor 14 operates in an operation mode in which a state transitions from the state CON3 to the state CON1. Similarly, when the AI processor 15 determines that the fog or the haze in the atmosphere occurs in the daytime, the processor 14 operates in an operation mode in which the state transitions from the state CON1 to the state CON3.

The AI processor 15 as an example of a second processor is configured using, for example, a CPU, a DSP, a GPU, an FPGA, and a memory, and extracts pixels corresponding to the subject (target area) that is a distant observation target from the data of the captured image of the subject captured by the image-capturing element 12 by using artificial intelligence (AI). The AI processor 15 calculates a spatial frequency for each of an area constituted by the extracted pixels and the overall captured image. The AI processor 15 detects and determines whether the fog or the haze occurs in the subject (target area) that is a distant observation target, in accordance with a comparison between calculation results of the spatial frequencies and the thresholds stored in the memory 13 (see the above description). The AI processor 15 includes an AI calculation processing unit 151 and a learning model memory 152. The above-described processings of the calculation of the individual spatial frequencies for the area constituted by the extracted pixels and the overall captured image as well as the detection and the determination of whether the fog or the haze occurs in the subject (target area) that is the distant observation target may be executed by the processor 14 instead of the AI processor 15, and the same applies to the following description.

The AI calculation processing unit 151 forms the artificial intelligence (AI) based on the learned model (see FIG. 2) stored in the learning model memory 152. For example, the AI calculation processing unit 151 inputs the data of the captured image of the subject captured by the image-capturing element 12 by using the learned model that is the parameter group for using the segmentation technique, and detects and extracts pixels corresponding to the subject (target area) that is the distant observation target from the input data of the captured image. The AI calculation processing unit 151 or the processor 14 calculates the spatial frequency for each of the area constituted by the extracted pixels and the overall captured image based on an extraction result, determines whether the fog or the haze occurs in the subject (target area) that is the distant observation target in accordance with the comparison between the calculation result of the spatial frequency and the threshold stored in the memory 13 (see the above description), and returns a determination result thereof to the processor 14.

Figure 4A:
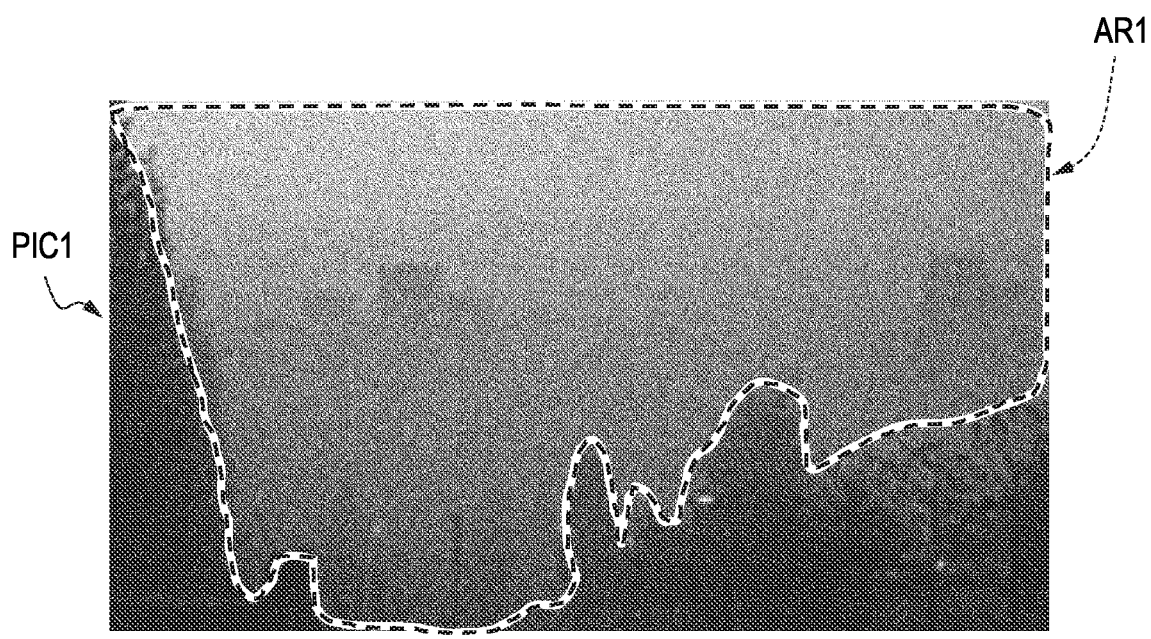
FIG. 4A is a diagram showing a situation in which fog or haze occurs in substantially overall area in an image.
Figure 4B:
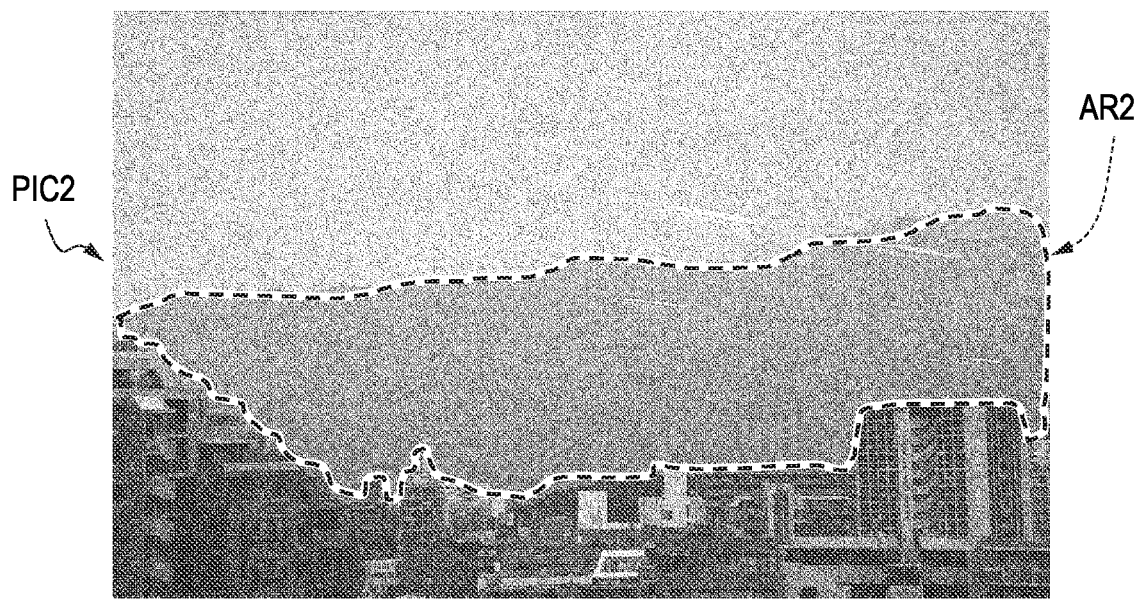
FIG. 4B is a diagram showing a situation in which the fog or the haze occurs in a distant target area in an image.
Figure 6:
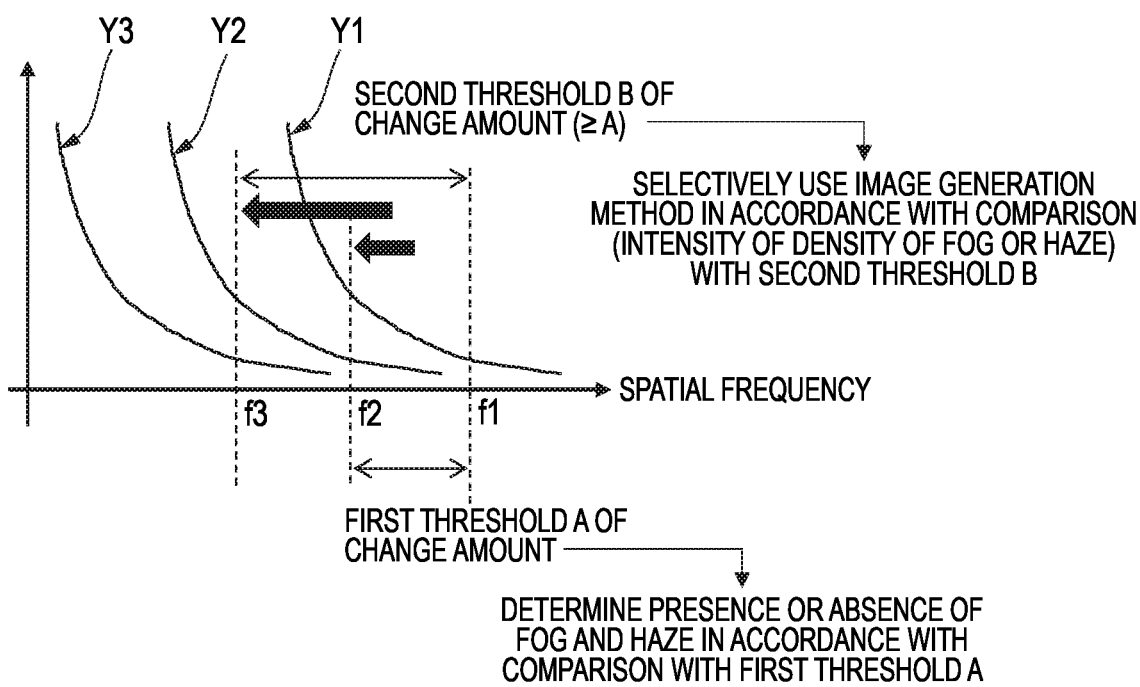
FIG. 6 is a diagram schematically showing an example of a relationship among a spatial frequency, a first threshold A, and a second threshold B.

Here, the determination of the presence or absence of the fog or the haze and intensity (density) of the fog or the haze by the AI processor 15 or the processor 14 will be described with reference to FIGS. 4A, 4B, and 6. FIG. 4A is a diagram showing a situation in which the fog or the haze occurs in a substantially overall area AR1 in an image PIC1. FIG. 4B is a diagram showing a situation in which the fog or the haze occurs in a distant target area AR2 in an image PIC2. FIG. 6 is a diagram schematically showing an example of a relationship among a spatial frequency, the first threshold A, and the second threshold B. In FIG. 6, a horizontal axis represents the spatial frequency. That is, predetermined high-frequency spatial frequencies are calculated for spatial frequency characteristics Y1, Y2, and Y3, and calculation results thereof are f1 (see the above description), f2, and f3.

When a meteorological phenomenon such as the fog or the haze occurs in the atmosphere, since the atmosphere (air) in the substantially overall area AR1 in the image PIC1 or the distant target area AR2 in the image PIC2 is blurred, image quality of the image PIC1 or the image PIC2 deteriorates. The AI calculation processing unit 151 extracts pixels (for example, the substantially overall area AR1) corresponding to a subject (target area) that is a distant observation target in the image PIC1 input to the AI calculation processing unit 151 based on a learned model using the existing segmentation technique. Similarly, the AI calculation processing unit 151 extracts pixels (for example, the distant target area AR2) corresponding to a subject (target area) that is a distant observation target in the image PIC2 input to the AI calculation processing unit 151 based on the learned model using the existing segmentation technique.

The AI calculation processing unit 151 calculates a spatial frequency for each of the substantially overall area AR1 and the entire area in the image PIC1, and determines whether a difference (change amount) between the predetermined high-frequency part f2 of the spatial frequency (high-frequency spatial frequency) corresponding to each area and the reference value f1 of the predetermined high-frequency part of the spatial frequency (high-frequency spatial frequency) of the corresponding area stored in the memory 13 is equal to or larger than the first threshold A stored in the memory 13. When determining that the change amount (see the above description) of the high-frequency spatial frequency of the substantially overall area AR1 or the entire area in the image PIC1 is equal to or larger than the first threshold A, the AI calculation processing unit 151 determines that the fog or the haze occurs in the image PIC1.

Similarly, the AI calculation processing unit 151 calculates a spatial frequency for each of the distant target area AR2 and the entire area in the image PIC2, and determines whether a difference (change amount) between the predetermined high-frequency part f2 of the spatial frequency (high-frequency spatial frequency) corresponding to each area and the reference value f1 of the predetermined high-frequency part of the spatial frequency (high-frequency spatial frequency) of the corresponding area stored in the memory 13 is equal to or larger than the first threshold A stored in the memory 13. When determining that the change amount (see the above description) of the high-frequency spatial frequency of the distant target area AR2 or the entire area in the image PIC2 is equal to or larger than the first threshold A, the AI calculation processing unit 151 determines that the fog or the haze occurs in the image PIC2.

The learning model memory 152 is configured with, for example, a memory such as a RAM, a ROM, or a flash memory. The learning model memory 152 stores a learned model for a detection processing of the fog or the haze created in advance by a learning processing. The AI calculation processing unit 151 reads the learned model from the learning model memory 152, extracts pixels corresponding to the subject (target area) that is the distant observation target in the image input to the AI calculation processing unit 151, and can detect and determine the presence or absence of the fog or the haze with high accuracy.

The processor 14 may simply determine the presence or absence of the fog or the haze based on, for example, the output (that is, the current time) of the timer TM1, instead of performing the highly accurate detection processing of the presence or absence of the fog or the haze using the AI processor 15. This is based on a fact that, for example, when a time zone in which the fog or the haze is likely to occur can be specified in advance in view of regional characteristics around the installation position of the monitoring camera 1, the presence or absence of the fog or the haze can be simply determined even when a current time is a time zone in which the fog or the haze is likely to occur.

When the monitoring camera 1 receives a coordinate designation notification that designates coordinates at which the fog or the haze is assumed to occur in a captured image from the server 50, the processor 14 or the AI processor 15 may determine whether the fog or the haze occurs only at designated coordinates (for example, coordinates on the data of the captured image generated by the image-capturing element 12 or the processor 14) included in the coordinate designation notification.

The communication IF circuit 16 performs data communication (transmission and reception) with the server 50 connected via the network NW1. The communication IF circuit 16 transmits, for example, the data of the captured image generated by the processor 14 to the server 50. Further, when receiving the coordinate designation notification (see the above description) indicating the presence or absence of the fog or the haze from the server 50, the communication IF circuit 16 may send the designated coordinates (see the above description) included in the coordinate designation notification to the processor 14 or the AI processor 15.

The IR lighting unit 17 starts to radiate IR light RD1 having a near-infrared wavelength band toward an image-capturing area based on a control signal (for example, an instruction to start irradiation of the IR light) from the processor 14. The IR lighting unit 17 ends the irradiation of the image-capturing area with the IR light RD1 based on a control signal (for example, an instruction to end the irradiation of the IR light RD1) from the processor 14. Further, the IR lighting unit 17 radiates the IR light RD1 while increasing or decreasing an intensity of the IR light RD1 currently radiated, based on a control signal (for example, an instruction to adjust the intensity of the IR light RD1) from the processor 14.

The external storage medium M1 such as an SD card is inserted into and removed from the external storage medium IF 18.

Based on a control signal from the processor 14, the pan-tilt driving unit PTM1 adjusts camera parameters (for example, a pan rotation amount and a tilt rotation amount) related to pan rotation or tilt rotation to execute the pan rotation, the tilt rotation, or both the pan rotation and the tilt rotation of the monitoring camera 1. When the monitoring camera 1 has a configuration in which the pan rotation and the tilt rotation are not performed, the pan-tilt driving unit PTM1 may be omitted from the configuration of the monitoring camera 1.

Figure 3:
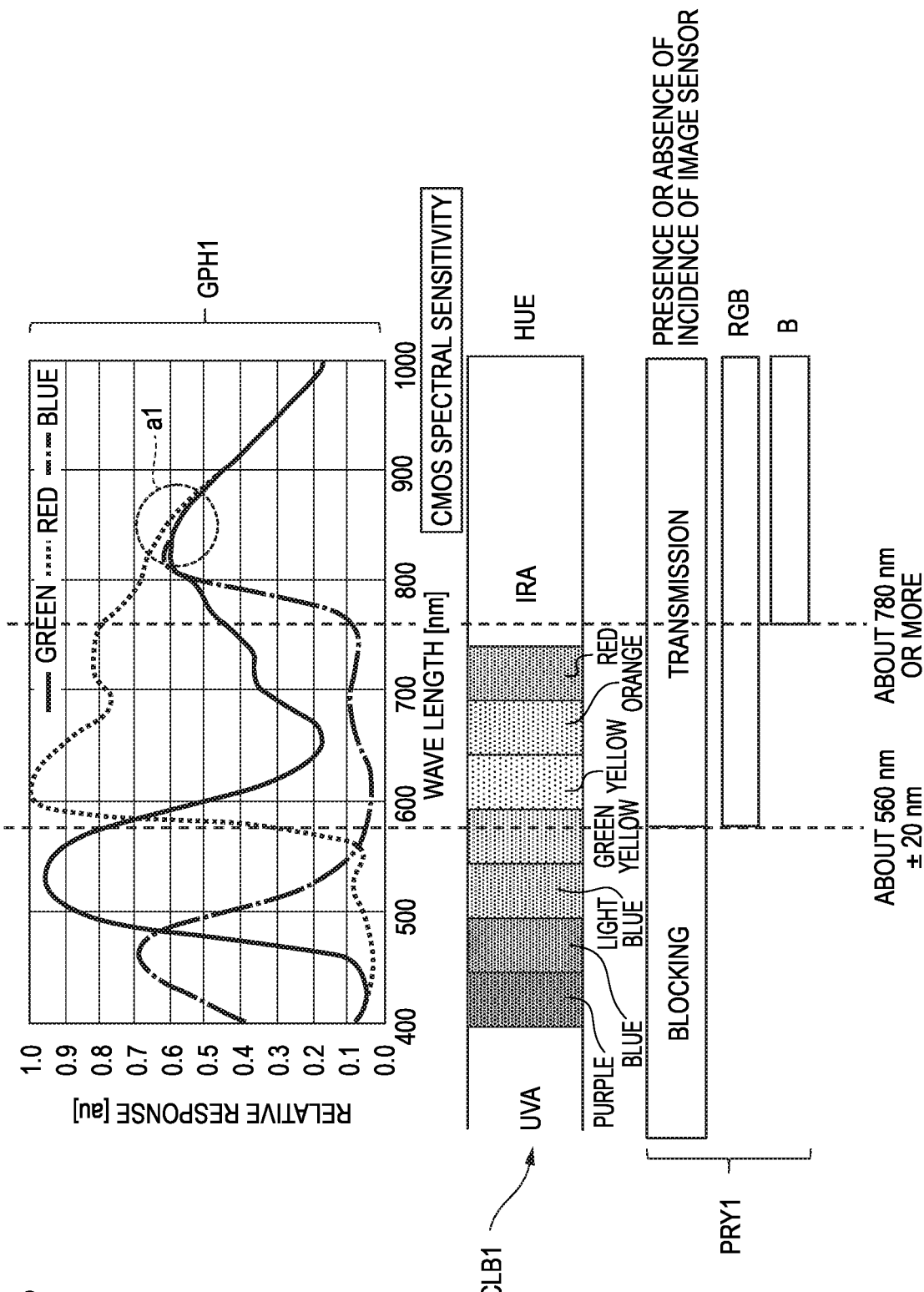
FIG. 3 is a diagram showing an operation outline example of the monitoring camera according to the first embodiment.

Next, an outline of an operation related to generation of a captured image in the state CON3 where the fog or the haze occurs by the processor 14 of the monitoring camera 1 according to the first embodiment will be described with reference to FIGS. 3 and 6. FIG. 3 is a diagram showing an operation outline example of the monitoring camera 1 according to the first embodiment. In a graph GPH1 shown in FIG. 3, spectral sensitivity characteristics of the image-capturing element 12 in which a horizontal axis represents a wavelength [nm] and a vertical axis represents sensitivity are shown. In a lower part of the graph GPH1, a hue range CLB1 and various characteristics PRY1 used for generating the data of the captured image are shown.

According to the graph GPH1, it is shown that the blue component signal (hereinafter, may be abbreviated as "B signal"), the red component signal (hereinafter, may be abbreviated as "R signal"), and the green component signal (hereinafter, may be abbreviated as "G signal") for each pixel acquired by the image-capturing element 12 have the same sensitivity in a wavelength band of the near-infrared light (for example, a wavelength band a1 of 850 [nm]). Therefore, even when the image-capturing element 12 in which RGB color filters are arrayed is used, image-capturing of the near-infrared light is possible.

As described above, the visible light cut filter CF1 transmits light having a wavelength equal to or larger than a specific wavelength (for example, 560±20 [nm: nanometers]) among the incident light ICL1 (an example of light from the subject) transmitted through the lens 11. In other words, the visible light cut filter CF1 blocks light having a wavelength less than the specific wavelength. Therefore, as indicated by the characteristics PRY1, when the visible light cut filter CF1 is effective, all light (for example, from UV light to the IR light) having a wavelength in a wavelength band indicated by the hue range CLB1 is not incident on the image-capturing element 12, and only light having a wavelength equal to or larger than the specific wavelength is incident on the image-capturing element 12.

Here, although the specific wavelength is, for example, 560±20 [nm], when a meteorological phenomenon such as the fog or the haze occurs, light having a wavelength less than the specific wavelength is easily scattered by water vapor that constitutes the fog or the haze, which may become an obstacle in generating a sharp image of the subject. Therefore, in the first embodiment, the monitoring camera 1 generates a captured image based on light having a wavelength equal to or larger than the specific wavelength by utilizing characteristics that wavelength of light is equal to or larger than the specific wavelength (for example, the wavelength of 560±20 [nm]), and the longer the wavelength of light is, the more difficult it is to be scattered by the water vapor that constitutes the fog or the haze. Accordingly, the monitoring camera 1 can generate a sharp captured image even when the fog or the haze occurs.

However, since the specific wavelength is a wavelength in a wavelength band of the visible light (for example, 400 to 760 [nm]), it is possible to generate a captured image by using the R signal, the G signal, and the B signal (that is, RGB signals) based on light having a wavelength equal to or larger than the specific wavelength and a wavelength in a wavelength band of the visible light (for example, wavelength bands corresponding to hues of yellow, orange, and red).

Therefore, when a degree of the fog or the haze is not so high (see FIG. 6), the processor 14 of the monitoring camera 1 can generate a captured image in which an amount of light that reaches the image-capturing element 12 is larger than that of a monochrome captured image captured only with the near-infrared light (IR light) and a state of the subject is sharp even when the fog or the haze occurs, by using the RGB signals based on light having a wavelength that is equal to or larger than the specific wavelength and that has a wavelength band of the visible light (for example, the wavelength bands corresponding to the hues of the yellow, the orange, and the red) in addition to the wavelength band of the near-infrared light. For example, when it is determined that the change amount of the high-frequency spatial frequency (see the above description) of the substantially overall area AR1 or the entire area in the image PIC1 is less than the second threshold B, the processor 14 determines that the degree of the fog or the haze is not so high, and generates a monochrome captured image in which a state of the subject is sharp even when the fog or the haze occurs by using the RGB signals based on light having a wavelength that is equal to or larger than the specific wavelength and that has a wavelength band of the visible light (for example, the wavelength bands corresponding to the hues of the yellow, the orange, and the red) in addition to the wavelength band of the near-infrared light. Here, a method of generating the captured image has been described by exemplifying the image PIC1, but the same applies to the image PIC2, and therefore the description thereof will be omitted.

In contrast, when the degree of the fog or the haze is high (see FIG. 6), the monitoring camera 1 can generate a captured image in which a state of the subject is sharp even when the degree of the fog or the haze is high, by only using the B signal (see the wavelength band a1) having high sensitivity to the near-infrared light (for example, a wavelength band of 780 [nm] or more) but hardly having sensitivity to the wavelength band of the visible light equal to or larger than the specific wavelength. For example, when it is determined that the change amount (see the above description) of the high-frequency spatial frequency of the substantially overall area AR1 or the entire area in the image PIC1 is equal to or larger than the second threshold B, the processor 14 determines that the degree of the fog or the haze is high, and generates a monochrome captured image in which a state of the subject is sharp even when the fog or the haze occurs, by only using the B signal (see reference numeral a1) having high sensitivity to the near-infrared light (for example, the wavelength band of 780 [nm] or more) but hardly having sensitivity to the wavelength band of the visible light equal to or larger than the specific wavelength. Here, a method of generating the captured image has been described by exemplifying the image PIC1, but the same applies to the image PIC2, and therefore the description thereof will be omitted.

That is, the processor 14 of the monitoring camera 1 selectively uses the method of generating the captured image in accordance with magnitude of the change amount (see the above description) of the high-frequency spatial frequency of the substantially overall area AR1 or the entire area in the image PIC1 and magnitude of the second threshold B. Accordingly, the monitoring camera 1 can adaptively generate a high-quality captured image in which an influence of the fog or the haze is reduced in accordance with, for example, a situation of a degree (for example, density) of the fog or the haze detected by the AI processor 15.

Figure 7:
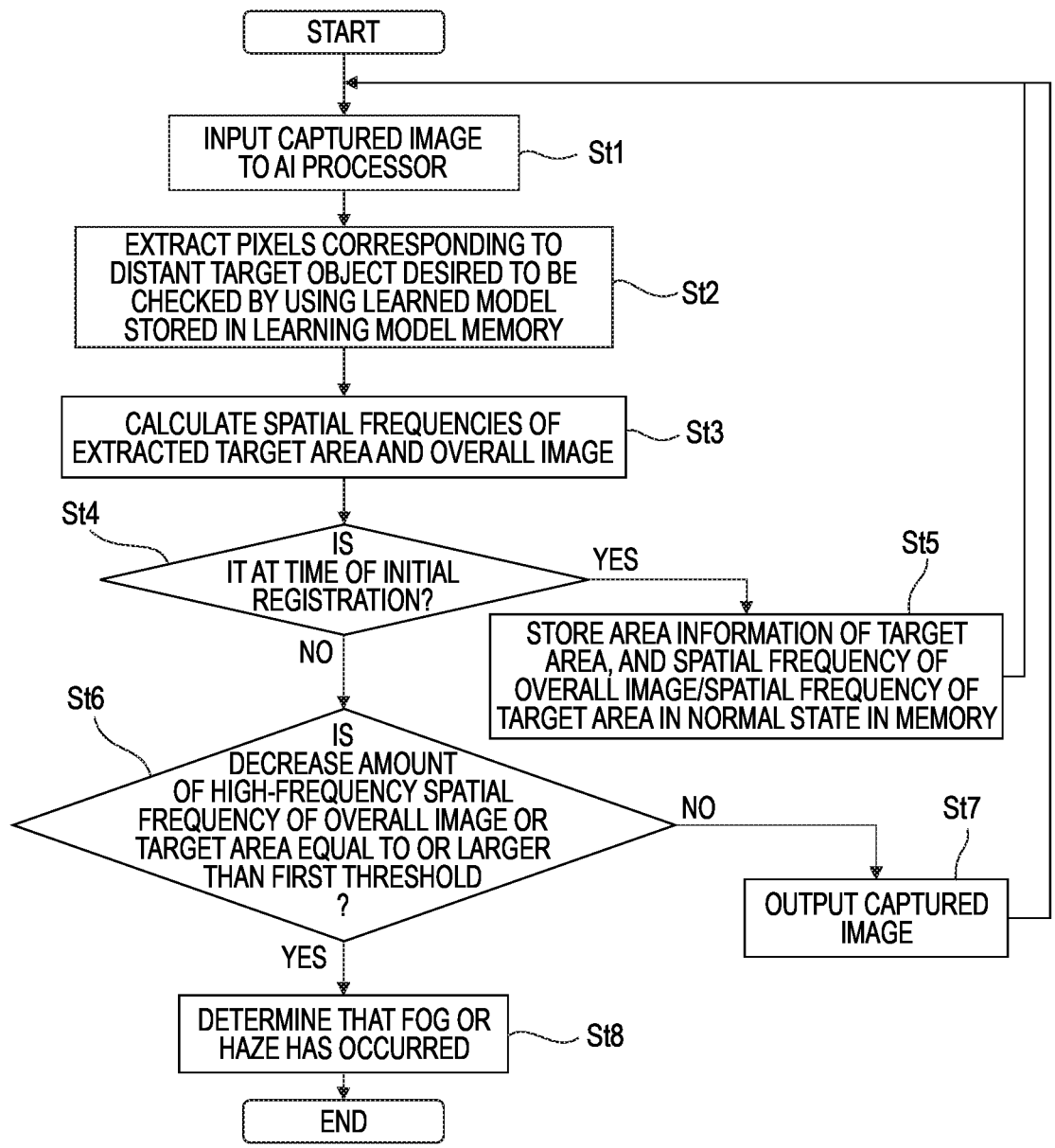
FIG. 7 is a flowchart showing, in time series, an example of an operation procedure, which is for determining presence or absence of the fog or the haze, of the monitoring camera according to the first embodiment.
Figure 8:
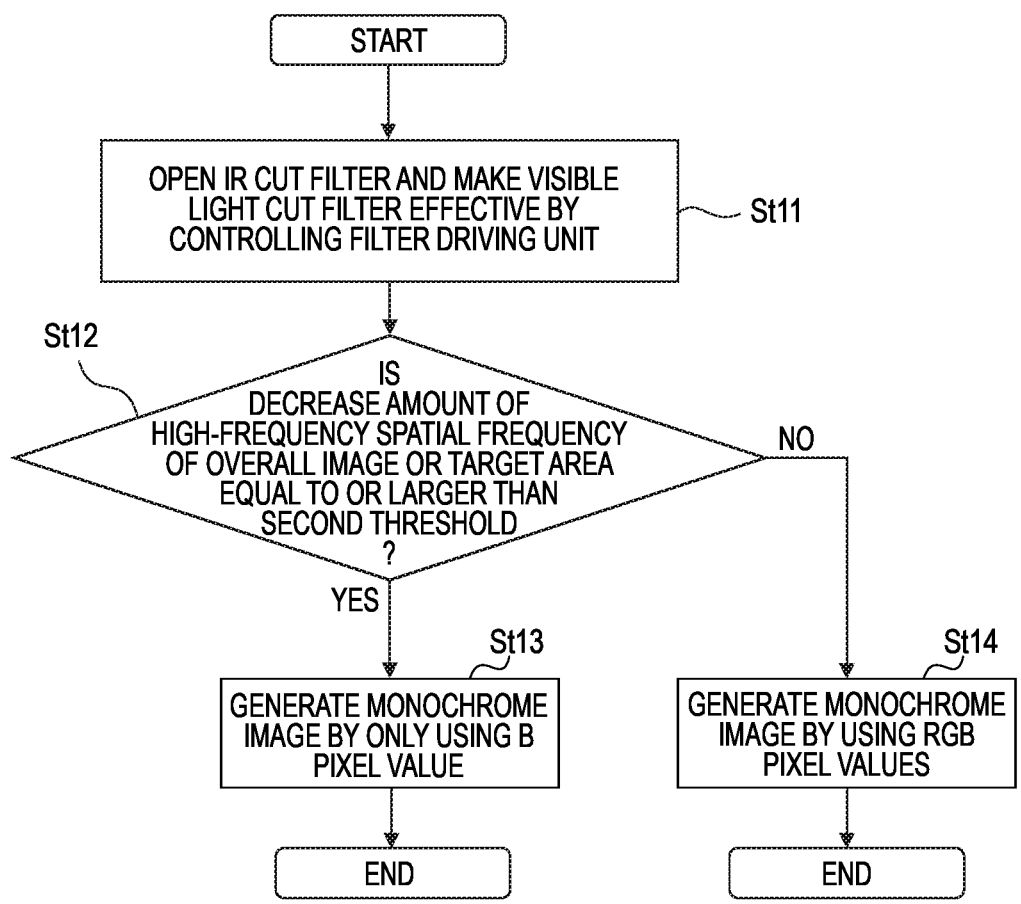
FIG. 8 is a flowchart showing, in time series, an example of an image processing operation procedure of the monitoring camera according to the first embodiment while the fog or the haze occurs.

Next, an example of an operation procedure of the monitoring camera 1 according to the first embodiment will be described with reference to FIGS. 7 and 8. FIG. 7 is a flowchart showing, in time series, an example of an operation procedure of the monitoring camera 1 according to the first embodiment, in which the operation procedure is for determining the presence or absence of the fog or the haze. FIG. 8 is a flowchart showing, in time series, an example of an image processing operation procedure of the monitoring camera 1 according to the first embodiment while the fog or the haze occurs. In FIGS. 7 and 8, the fog or the haze is shown as "fog or haze" for convenience.

In FIG. 7, the AI processor 15 inputs data of a captured image captured by the image-capturing element 12 (St1). The AI processor 15 uses a learned model read from the learning model memory 152 to extract pixels corresponding to a subject (target area) that is a distant observation target from the data of the captured image of the subject input in step St1 (St2). The AI processor 15 calculates a spatial frequency for each of an area constituted by the pixels extracted in step St2 and the overall captured image input in step St1 (St3). That is, in step St3, for example, a spatial frequency of the pixels (for example, see the substantially overall area AR1 in FIG. 4A) corresponding to the subject (target area) that is the distant observation target and a spatial frequency of the overall image PIC1 are calculated.

Here, when calculation results of the spatial frequencies in a normal state (that is, when the fog or the haze does not occur) of the subject (target area) that is the distant observation target in the captured image within a current angle of view of the monitoring camera 1 and the overall captured image are not registered (St4, YES), the AI processor 15 stores the calculation results in step St3 (that is, the calculation result of the spatial frequency of the pixels (for example, see the substantially overall area AR1 in FIG. 4A) corresponding to the subject (target area) that is the distant observation target, and the calculation result of the spatial frequency of the overall image PIC1), and area information indicating a coordinate position of the pixels extracted in step St2 in the memory 13 in association with each other (St5). After step St5, the processing of the AI processor 15 returns to step St1.

In contrast, when the calculation results of the spatial frequencies in a normal state (that is, when the fog or the haze does not occur) of the subject (target area) that is the distant observation target in the captured image within the current angle of view of the monitoring camera 1 and the overall captured image are registered in the memory 13 (St4, NO), the AI processor 15 determines whether a change amount (decrease amount) of a specific high-frequency spatial frequency of the spatial frequency of the target area or the overall captured image at the time of initial registration already registered in the memory 13 and a current time point is equal to or larger than the first threshold A (see FIG. 6) stored in the memory 13 (St6). When the AI processor 15 determines that the change amount (decrease amount) of the high-frequency spatial frequency is less than the first threshold A (St6, NO), the processor 14 outputs the data of the captured image input in step St1 as it is (St7).

In contrast, when determining that the change amount (decrease amount) of the high-frequency spatial frequency is equal to or larger than the first threshold A (St6, YES), the AI processor 15 determines that the fog or the haze occurs in the captured image input in step St1 (St8). The AI processor 15 returns a determination result in step St8 to the processor 14. Steps St3 to St8 may be performed by the processor 14.

In FIG. 8, based on the determination result in step St8, the processor 14 generates a control signal for making the visible light cut filter CF1 effective and opening the IR cut filter CF2, and sends the generated control signal to the filter driving unit FM1 (St11).

After step St11, the processor 14 determines whether the change amount (decrease amount) of the specific high-frequency spatial frequency of the spatial frequency of the target area or the overall captured image at the time of the initial registration already registered in the memory 13 and at the current time point (for example, when the data of the captured image is input in step St1) is equal to or larger than the second threshold B (see FIG. 6) stored in the memory 13 (St12).

When determining that the change amount (decrease amount) of the high-frequency spatial frequency is equal to or larger than the second threshold B (St12, YES), the processor 14 generates data of a monochrome captured image by only using a pixel value of the B signal corresponding to light having the wavelength band of the near-infrared light acquired by the image-capturing element 12 for an overall size of the captured image (St13).

In contrast, when determining that the change amount (decrease amount) of the high-frequency spatial frequency is less than the second threshold B (St12, NO), the processor 14 generates the data of the monochrome captured image by using pixel values of the RGB signals corresponding to light having the wavelength equal to or larger than the specific wavelength acquired by the image-capturing element 12 for the overall size of the captured image (St14).

Figure 9:
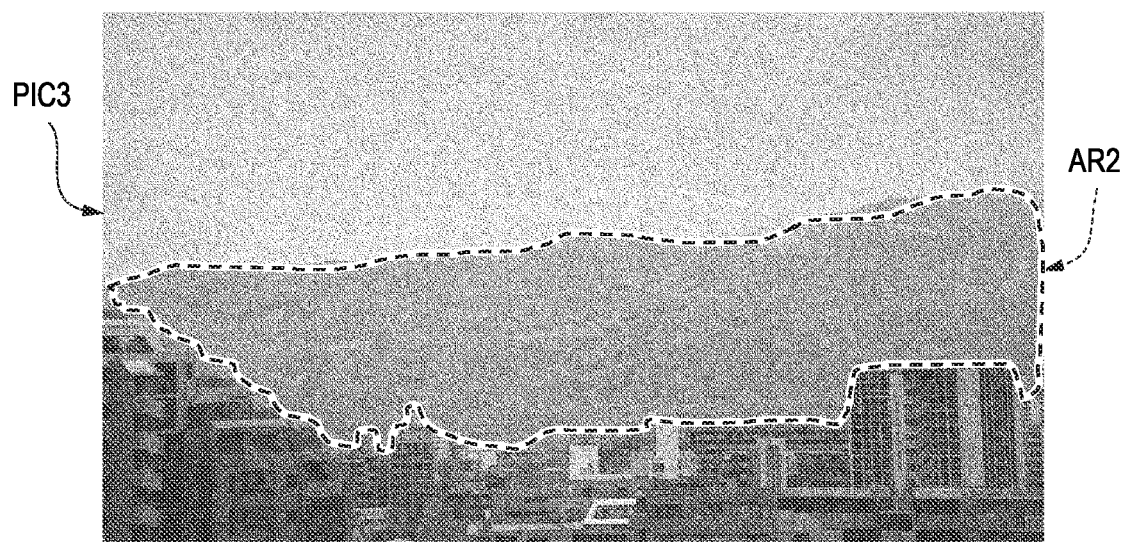
FIG. 9 is a diagram showing an example of an image generated by the image processing operation procedure of FIG. 8.

FIG. 9 is a diagram showing an example of an image PIC3 generated by the image processing operation procedure of FIG. 8. The image PIC3 shown in FIG. 9 is generated using, for example, only the pixel value of the B signal corresponding to the light having the wavelength band of the near-infrared light or the pixel values of the RGB signals corresponding to the light having the wavelength equal to or larger than the specific wavelength. That is, in any case, since light having a wavelength band (for example, a wavelength less than the specific wavelength) that is easily scattered by water vapor under a situation in which the fog or the haze occurs is not used for image-capturing by the image-capturing element 12, the image PIC3 in which a distant monitoring region (for example, the target area AR2) is sharp is obtained.

As described above, the monitoring camera 1 according to the first embodiment includes the image-capturing element 12 that includes the plurality of pixels, and that is configured to acquire, for each of the pixels, the blue component signal, the red component signal, and the green component signal corresponding to the light which is from the subject and which is incident through the fog or the haze; the optical filter (for example, the visible light cut filter CF1) disposed between the subject and the image-capturing element 12, and configured to transmit specific-wavelength light (for example, the light having the wavelength of 560±20 [nm] or more) having the wavelength equal to or larger than the specific wavelength among the light from the subject; and the processor 14 configured to generate and output the captured image of the subject based on either a blue component signal, a red component signal, and a green component signal for each of the pixels corresponding to the specific-wavelength light or a blue component signal for each of the pixels corresponding to the specific-wavelength light.

Accordingly, even when a phenomenon (for example, a meteorological phenomenon such as the fog or the haze) that causes image quality of the captured image of the subject to deteriorate occurs, since the monitoring camera 1 blocks the light that has the wavelength band and that is easily scattered by the water vapor which constitutes the fog or the haze (that is, the light having the wavelength less than the specific wavelength), it is possible to improve the image quality of the image of the subject to improve efficiency of observation work (for example, to monitor a distant subject remote from the installation place of the monitoring camera 1).

The monitoring camera 1 further includes the second processor (for example, the AI processor 15) configured to specify a region of interest (for example, a distant monitoring area) of an image captured by the image-capturing element 12. When determining whether the fog or the haze occurs in the specified region of interest, the processor 14 selects either a blue component signal, a red component signal, and a green component signal for each of the pixels corresponding to the specific-wavelength light or a blue component signal for each of the pixels corresponding to the specific-wavelength light in accordance with a degree of the fog or the haze that occurs in the region of interest. Accordingly, the monitoring camera 1 can adaptively generate a high-quality captured image in which an influence of the fog or the haze is reduced in accordance with, for example, a situation of a degree (for example, density) of the fog or the haze detected by the AI calculation processing unit 151.

The processor 14 or the second processor (for example, the AI processor 15) determines that the fog or the haze occurs in the region of interest when a decrease amount (change amount) of a high-frequency spatial frequency of an image portion of the region of interest is equal to or larger than the first threshold A. Accordingly, the monitoring camera 1 can easily determine presence or absence of the fog or the haze in the region of interest that is an observation target in accordance with comparison between the decrease amount of the predetermined high-frequency spatial frequency of the input captured image and the first threshold A.

The second processor (for example, the AI processor 15) determines whether the fog or the haze occurs in the region of interest based on the learned model using the artificial intelligence formed by the learning processing. Accordingly, the monitoring camera 1 can accurately and easily determine the presence or absence of the fog or the haze in the region of interest that is the observation target by using an existing AI technique (for example, the segmentation technique).

In the first embodiment, the specific wavelength is, for example, 560±20 [nanometers]. Accordingly, for example, the monitoring camera 1 can generate a captured image in which the influence of the fog or the haze is reduced and whose sharpness is high by utilizing characteristics that light having a wavelength less than 560±20 [nm] is easily scattered by the water vapor that constitutes the fog or the haze.

The monitoring camera 1 further includes the second optical filter (for example, the IR cut filter CF2) configured to transmit the near-infrared light among the light from the subject. When a predetermined condition (for example, a state where neither the fog nor the haze occurs in the daytime) is satisfied, the processor 14 generates a captured image of the subject based on the light transmitted through the second optical filter. Accordingly, in the state where neither the fog nor the haze occurs in the daytime, the monitoring camera 1 can cut the IR light and capture an image, and therefore can generate a captured image using the highly accurate color RGB signals.

Second Embodiment

In the first embodiment, an example is described in which a captured image in which the influence of the fog or the haze can be reduced is generated by only using the light that has the wavelength equal to or larger than the specific wavelength (for example, 560 [nm]) and that is transmitted through the visible light cut filter CF1. In a second embodiment, an example will be described in which a captured image in which an influence of fog or haze can be reduced is generated mainly by a signal processing without using the visible light cut filter CF1. The monitoring camera 1 according to the second embodiment has a configuration in which the visible light cut filter CF1 is omitted from the hardware configuration example shown in FIG. 2. Therefore, in description of the hardware configuration of the monitoring camera 1 according to the second embodiment, description of the same content as that of the first embodiment will be simplified or omitted, and different content will be described.

Figure 10:
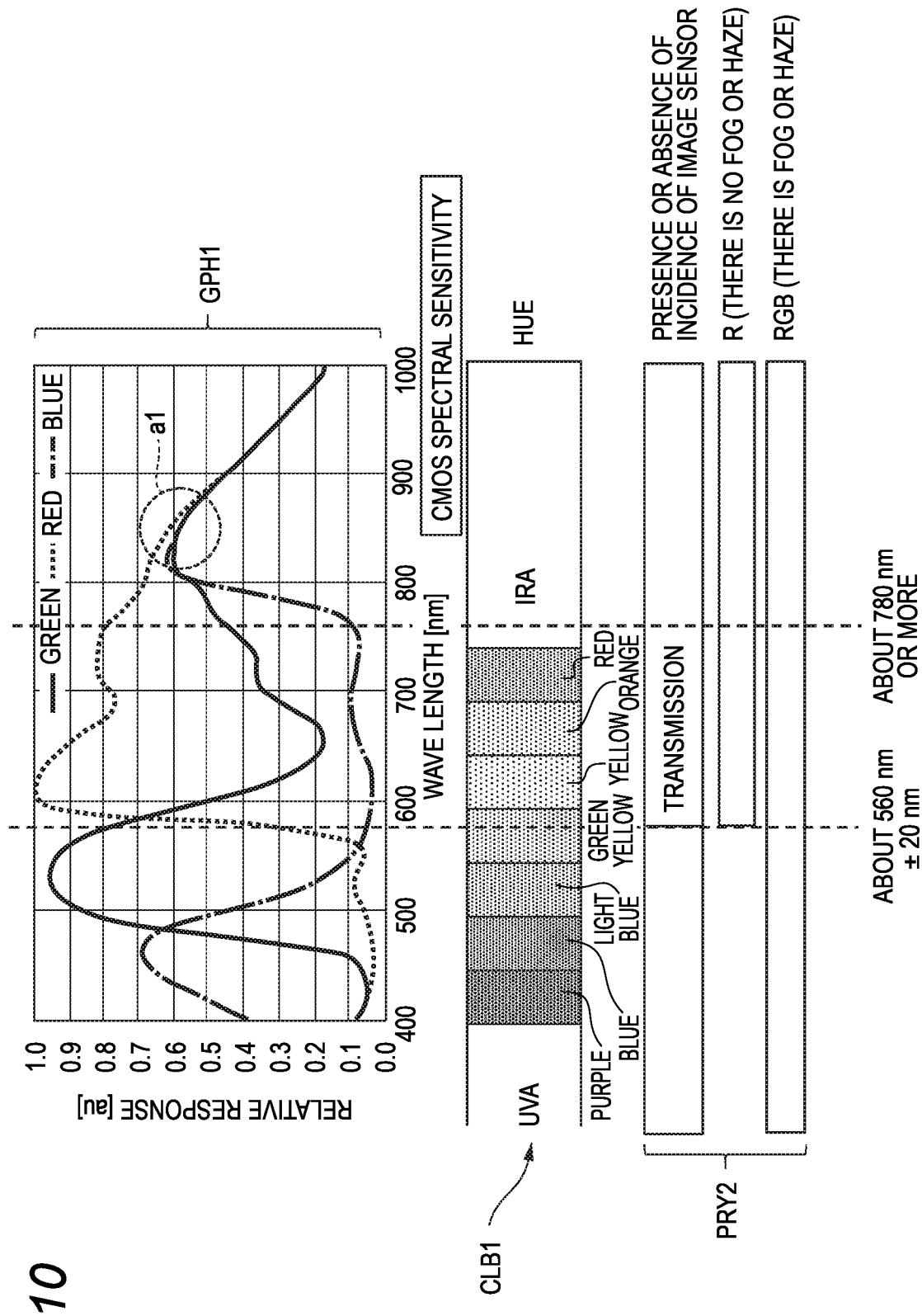
FIG. 10 is a diagram showing an operation outline example of a monitoring camera according to the second embodiment.

Next, an outline of an operation related to generation of a captured image in the state CON3 where the fog or the haze occurs by the processor 14 of the monitoring camera 1 according to the second embodiment will be described with reference to FIGS. 10 and 6. FIG. 10 is a diagram showing an operation outline example of the monitoring camera 1 according to the second embodiment. In the graph GPH1 shown in FIG. 10, spectral sensitivity characteristics of the image-capturing element 12 in which a horizontal axis represents a wavelength [nm] and a vertical axis represents sensitivity are shown. In a lower part of the graph GPH1, the hue range CLB1 and various characteristics PRY2 used for generating data of a captured image are shown. In description of FIG. 10, the same elements as those in FIG. 3 are denoted by the same reference numerals, description thereof will be simplified or omitted, and different content will be described.

In the second embodiment, when generating the data of the captured image, the processor 14 selects the R signal corresponding to the light having the wavelength equal to or larger than the specific wavelength (for example, 560±20 [nm]) described with reference to the first embodiment in order to form a luminance signal of the captured image in which the influence of the fog or the haze is reduced. Further, when generating the data of the captured image, the processor 14 generates a captured image in which only a color-of-interest portion such as orange or red is colored by coloring a red portion in the captured image captured with the RGB signals with orange or red and by coloring a blue or green background portion such as sky, sea, or mountain in the same captured image in monochrome (black and white).

That is, since the visible light cut filter CF1 is omitted in the second embodiment, light (for example, from UV light to IR light) having a wavelength in a wavelength band indicated by the hue range CLB1 is incident on the image-capturing element 12. However, since light having a wavelength less than the specific wavelength (for example, 560±20 [nm]) is easily scattered by water vapor that constitutes the fog or the haze, although the visible light cut filter CF1 is not used in the second embodiment, the processor 14 selects and uses light having a wavelength equal to or larger than the specific wavelength (see the above description) in a wavelength band of the light incident on the image-capturing element 12 in order to form the luminance signal of the captured image. Specifically, the R signal having high sensitivity equal to or higher than the specific wavelength (see the above description) is used.

The processor 14 checks a hue of a signal corresponding to the light incident on the image-capturing element 12 (that is, the light (for example, from the UV light to the IR light) having the wavelength in the wavelength band indicated by the hue range CLB1), and performs a coloring processing in which a red portion is colored with orange or red, and other portions of colors other than the red (for example, the blue portion or the green portion such as the sky, the sea, or the mountain described above) is colored in monochrome. Accordingly, the processor 14 can generate a captured image in which red or orange coloring can be applied to a region of interest such as the red portion (for example, a life jacket worn by a person in an angle of view) of the color RGB signals to make the region of interest conspicuous or to call attention.

Figure 11:
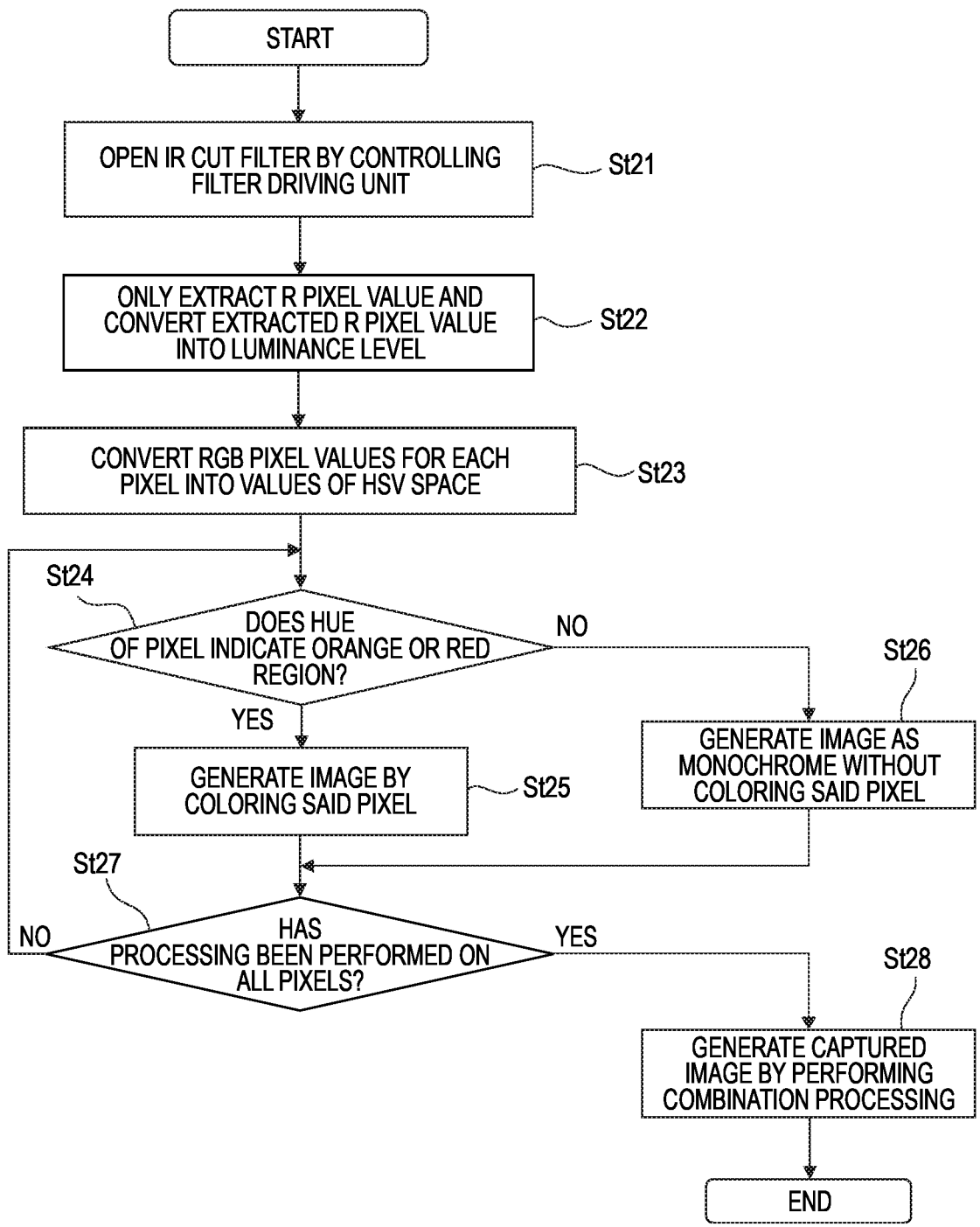
FIG. 11 is a flowchart showing, in time series, an example of an image processing operation procedure of the monitoring camera according to the second embodiment while fog or haze occurs.

Next, an example of an operation procedure of the monitoring camera 1 according to the second embodiment will be described with reference to FIGS. 7 and 11. FIG. 11 is a flowchart showing, in time series, an example of an image processing operation procedure of the monitoring camera 1 according to the second embodiment while the fog or the haze occurs. Since the operation procedure, which is for determining presence or absence of the fog or the haze, of the monitoring camera 1 is the same as that of FIG. 7, description thereof will be omitted here.

In FIG. 11, the processor 14 generates a control signal for opening the IR cut filter CF2 based on a determination result in step St8, and sends the generated control signal to the filter driving unit FM1 (St21). The processor 14 only extracts the R signal (R pixel) of the RGB signals for each pixel acquired by the image-capturing element 12, and generates a luminance signal (luminance level) of a captured image (St22). Further, the processor 14 converts pixel values (RGB pixel values) of the RGB signals for each pixel acquired by the image-capturing element 12 into values (that is, a hue value, a saturation value, and a brightness value) of a hue saturation brightness (HSV) space (St23).

The processor 14 determines whether the hue value for each pixel converted in step St23 indicates an orange or red region (St24). When determining that the hue value of the pixel indicates the orange or red region (St24, YES), the processor 14 generates an image of the pixel in which the pixel is colored in red (St25). In contrast, when determining that the hue value of the pixel indicates neither the orange region nor the red region (St24, NO), the processor 14 generates an image of the pixel in which the pixel is not colored and is monochrome (black and white) (St26).

After step St25 or step St26, the processor 14 determines whether the processing of step St25 or step St26 has been performed on all pixels (St27). When it is determined that the processing of step St25 or step St26 has not been performed on all the pixels (St27, NO), the processing of the processor 14 returns to step St24. That is, the processor 14 repeatedly executes the processing of step St25 or step St26 for the pixels until the processing of step St25 or step St26 has been performed on all the pixels.

In contrast, when determining that the processing of step St25 or step St26 has been performed on all the pixels (St27, YES), the processor 14 generates data of the captured image (see FIG. 9) by combining images after the processing of step St25 or step St26 for all the pixels (St28).

As described above, the monitoring camera 1 according to the second embodiment includes the image-capturing element 12 that includes the plurality of pixels, and that is configured to acquire, for each of the pixels, the blue component signal, the red component signal, and the green component signal corresponding to light which is from the subject and which is incident through the fog or the haze; and the processor 14 configured to generate the luminance signal based on a red component signal (R signal) for each of the pixels corresponding to light from the subject, and to generate a first pixel signal (an image of a pixel colored with red) in which a color (for example, red) corresponding to a specific hue (for example, orange or red) is colored and a second pixel signal (for example, an image of a monochrome pixel) in which a color (for example, red) corresponding to the specific hue (for example, orange or red) is not colored, based on a blue component signal, a red component signal, and a green component signal for each of the pixels corresponding to light from the subject. The processor 14 generates and outputs a captured image of the subject based on the luminance signal, the first pixel signal, and the second pixel signal.

Accordingly, even when a phenomenon (for example, a meteorological phenomenon such as the fog or the haze) that causes image quality of the captured image of the subject to deteriorate occurs, unlike the first embodiment, since the monitoring camera 1 blocks the light that has the wavelength band and that is easily scattered by the water vapor which constitutes the fog or the haze (that is, the light having the wavelength less than the specific wavelength) without including the visible light cut filter CF1, it is possible to improve the image quality of the image of the subject to improve efficiency of observation work.

The monitoring camera 1 further includes the second processor (for example, the AI processor 15) configured to specify a region of interest (for example, a distant monitoring area) of an image captured by the image-capturing element 12. The processor 14 generates the luminance signal, the first pixel signal, and the second pixel signal when the fog or the haze occurs in the specified region of interest. Accordingly, for example, when the fog or the haze detected by the AI calculation processing unit 151 is detected, the monitoring camera 1 can generate a high-quality captured image in which the influence of the fog or the haze is reduced.

The processor 14 or the second processor (for example, the AI processor 15) determines that the fog or the haze occurs in the region of interest when a decrease amount of a high-frequency spatial frequency of an image portion of the region of interest is equal to or larger than the first threshold A. Accordingly, the monitoring camera 1 can easily determine presence or absence of the fog or the haze in the region of interest that is an observation target in accordance with comparison between the decrease amount of the predetermined high-frequency spatial frequency of the input captured image and the first threshold A.

The second processor (for example, the AI processor 15) determines whether the fog or the haze occurs in the region of interest based on a learned model using artificial intelligence formed by a learning processing. Accordingly, the monitoring camera 1 can accurately and easily determine the presence or absence of the fog or the haze in the region of interest that is the observation target by using an existing AI technique (for example, a segmentation technique).

The monitoring camera 1 further includes the second optical filter (for example, the IR cut filter CF2) configured to transmit near-infrared light among the light from the subject. When a predetermined condition (for example, a state where neither the fog nor the haze occurs in daytime) is satisfied, the processor 14 generates a captured image of the subject based on light transmitted through the second optical filter. Accordingly, in the state where neither the fog nor the haze occurs in the daytime, the monitoring camera 1 can cut the IR light and capture an image, and therefore can generate a captured image using the highly accurate color RGB signals.

Although various embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined freely within a range not deviating from the spirit of the invention.

INDUSTRIAL APPLICABILITY

The present disclosure is useful as a monitoring camera, an image processing method, and a program that improve image quality of an image of a subject to improve efficiency of observation work even when a phenomenon that causes the image quality of the captured image of the subject to deteriorate occurs.

What is claimed is:
1. A monitoring camera, comprising:
an image-capturing element that includes a plurality of pixels, and that is configured to acquire, for each of the pixels, a blue component signal, a red component signal, and a green component signal corresponding to light which is from a subject and which is incident through fog or haze;
an optical filter that is disposed between the subject and the image-capturing element, and that is configured to transmit specific-wavelength light having a wavelength equal to or larger than a specific wavelength among the light from the subject;

a first processor that is configured to generate and output a captured image of the subject based on either the blue component signal, the red component signal, and the green component signal for each of the pixels corresponding to the specific-wavelength light or the blue component signal for each of the pixels corresponding to the specific-wavelength light; and a second processor that is configured to specify a region of interest of an image captured by the image-capturing element, wherein, when the fog or the haze occurs in the region of interest, the first processor selects either the blue component signal, the red component signal, and the green component signal for each of the pixels corresponding to the specific-wavelength light or the blue component signal for each of the pixels corresponding to the specific-wavelength light, in accordance with a degree of the fog or the haze that occurs in the region of interest.

2. The monitoring camera according to claim 1,
wherein, when a decrease amount of a high-frequency spatial frequency of an image portion of the region of interest is equal to or larger than a first threshold, the first processor determines that the fog or the haze occurs in the region of interest.

3. The monitoring camera according to claim 1,
wherein the second processor specifies the region of interest based on a learned model using artificial intelligence formed by a learning processing.

4. The monitoring camera according to claim 1,
wherein the specific wavelength is 560±20 nanometer.

5. The monitoring camera according to claim 1, further comprising:
a second optical filter that is configured to block near-infrared light of the light from the subject,
wherein, when a predetermined condition is satisfied, the first processor generates the captured image of the subject based on light transmitted through the second optical filter.

6. An image processing method executed by a monitoring camera, the image processing method comprising:
transmitting specific-wavelength light having a wavelength equal to or larger than a specific wavelength among light that is from a subject and that is incident through fog or haze by an optical filter provided in the monitoring camera;

acquiring, for each of pixels, a blue component signal, a red component signal, and a green component signal corresponding to the specific-wavelength light captured by an image-capturing element that comprises a plurality of the pixels and that is provided in the monitoring camera;

generating and outputting, by a first processor, a captured image of the subject based on either the blue component signal, the red component signal, and the green component signal for each of the pixels corresponding to the specific-wavelength light or the blue component signal for each of the pixels corresponding to the specific-wavelength light; and specifying, by a second processor, a region of interest of an image captured by the image-capturing element, wherein, when the fog or the haze occurs in the region of interest, the first processor selects either the blue component signal, the red component signal, and the green component signal for each of the pixels corresponding to the specific-wavelength light or the blue component signal for each of the pixels corresponding to the specific-wavelength light, in accordance with a degree of the fog or the haze that occurs in the region of interest.

* * * * *